United States Patent Office 3,522,208
Patented July 28, 1970

3,522,208
STABILIZED POLYOLEFIN COMPOSITIONS CONTAINING A BISPHENOL AND OPTIONALLY A THIODIESTER
Andrew J. Dietzler, David A. Gordon, and John M. Corbett, Midland, Mich., assignors to The Dow Chemical Company, Midland, Mich., a corporation of Delaware
No Drawing. Original application Apr. 4, 1962, Ser. No. 184,938. Divided and this application Sept. 29, 1967, Ser. No. 683,051
Int. Cl. C08f 45/58
U.S. Cl. 260—45.85      7 Claims

ABSTRACT OF THE DISCLOSURE

Polyolefins such as polyethylene and polypropylene are stabilized against oxidative degradation by novel cycloalkylidenebis(o-cycloalkylphenols) and the corresponding alkylidene compounds, preferably in the additional presence of a dialkyl thiodipropionate. These bisphenols are made by reacting an o-cycloalkylphenol with the appropriate ketone or aldehyde in the presence of hydrogen chloride and preferably a thiol as reaction promoter.

---

This is a division of our copending application Ser. No. 184,938 filed Apr. 4, 1962, now abandoned.

This invention relates to new bisphenolic compounds and to polymeric compositions containing them. More specifically, it relates to certain new alkylidenebis(o-cycloalkylphenols) and to polyolefins advantageously stabilized therewith.

These new compounds have the structure

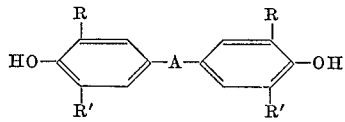

wherein R is hydrogen, lower alkyl of 1–4 carbon atoms, or cycloalkyl of 4–8 carbon atoms; R' is cycloalkyl of 4–8 carbon atoms or lower alkyl substitution products thereof; and A is a divalent radical selected from the group consisting of cycloalkylidene radicals of 4–8 carbon atoms and lower alkyl substitution products thereof, lower alkyl being defined as having from one to about four carbon atoms, and alkylidene radicals having the structure

wherein R" is hydrogen or lower alkyl of 1–4 carbon atoms and R''' is alkyl of 2 to about 17 carbon atoms.

Compounds having the structure defined are obtained by reacting an o-cycloalkylphenol with a suitable aliphatic carbonyl compound, i.e., an aliphatic aldehyde or ketone or cycloaliphatic ketone in the presence of an acidic condensation catalyst. Suitable phenols include o-cyclohexylphenol, o-(4-methylcyclohexyl)-phenol, o-(4-tert-butylcyclohexyl)phenol, 6-cyclohexyl-o-cresol, 2-tert-butyl-6-cyclohexylphenol, o-cyclopentylphenol, o-cyclooctylphenol, 6-cyclopentyl-o-cresol, 2,6-dicyclohexylphenol, and similar o-cycloalkylphenols. Aldehydes and ketones defined include propionaldehyde, isobutyraldehyde, heptaldehyde, stearaldehyde, methyl ethyl ketone, methyl amyl ketone, methyl hetpadecyl ketone, diethyl ketone, butyl decyl ketone, propyl heptadecyl ketone, and cycloaliphatic ketones such as cyclobutanone, cyclopentanone, cyclohexanone, cycloheptanone, cyclooctanone, and their lower alkyl substitution products.

Preferably, the condensation reaction is run using an excess of the phenol over the theoretical two moles per mole of aldehyde or ketone in the presence of hydrogen chloride or hydrogen bromide as the condensation catalyst. From 2 to 8 moles of phenol per mole of ketone in a reaction mixture saturated with anhydrous hydrogen halide is most preferred. A small amount of an acidic mercapto compound is often advantageously added to the reaction mixture as a promoter, particularly when the carbonyl reactant is a ketone. Suitable mercapto compounds include hydrogen sulfide and alkyl mercaptans such as methyl mercaptan and octyl mercaptan. The amount of promoter preferably employed corresponds to from 0.005 to 0.2 gram atom of sulfur per mole of aldehyde or ketone. The condensation reaction proceeds smoothly within the preferred temperature range of 10–60° C. and temperatures outside this range may also be used. An inert hydrocarbon solvent such as benzene, toluene, or ethylcyclohexane may be employed to obtain a more easily handled reaction mixture. Reaction times may vary from about one hour to fifty hours or more, depending on the particular reactants. For example, relatively hindered phenols and ketones other than methyl ketones require comparatively long reaction times when employed in the process.

The bisphenol product is best obtained from the reaction mixture by distilling off the relatively volatile constituents, thereby leaving the product as a distillation residue. This residue can be substantially freed of residual phenol by a steam distillation and then further purified, if desired, by crystallization from a suitable solvent such as chlorobenzene, methylcyclohexane, or the like.

Monosubstituted phenols are capable of reacting with an aldehyde or ketone in either ortho or para position although the para position is heavily favored. When a ketone is reacted with such a phenol, little or no ortho bisphenol is formed, but aldehydes in general yield a somewhat larger proportion of ortho isomer, making these products more difficult to purify by crystallization.

These compounds when pure are white crystalline solids more or less soluble in the common organic solvents and nearly insoluble in water. They are active antimicrobial agents useful in the preparation of bactericidal and fungicidal compositions. Being difunctional hydroxyl compounds they are useful as intermediates in the preparation of polyesters and they may also be reacted with olefin oxides such as ethylene and propylene oxides to make polyethers of various molecular weights. They have been discovered to possess particular and unexpectedly high utility as stabilizing agents when incorporated into linear polyolefins such as polyethylene and polypropylene. An unexpected property of this group of bisphenols which makes them unusually effective in this application is their high thermal stability as compared to that of known bisphenols.

The following examples illustrate various aspects of the invention.

EXAMPLE 1

A mixture of 2115 g. of o-cyclohexylphenol, 700 ml. of toluene, and 2 ml. of octyl mercaptan was heated in a reaction flask to 40° C. and anhydrous hydrogen chloride was bubbled in with stirring at 40–42° C. for 10 minutes to saturate the solution. Stirring was continued at 42–43° C. and 144.2 g. of methyl ethyl ketone was added dropwise over a period of about 11 minutes. The solution was stirred and HCl saturation maintained by slow bubbling of the gas for 17.6 hours at 36–42° C. The reaction mixture was then warmed to 50° C., blown with nitrogen for 30 minutes, and diluted with 750 ml. of toluene. The diluted solution was washed five times with 500 ml. portions of water and then distilled under reduced pressure to remove the volatile constituents. A total of 1748 g. of o-cyclohexylphenol was recovered. The residue was crude 4,4'-sec-butylidenebis(2-cyclohexylphenol), a light amber brittle solid amounting to 407 g. Crystallization of this product from a toluene-petroleum ether mixture yielded a white crystalline solid, melting point 130–2° C. Elemental analysis showed 83.2% carbon and 9.6% hydrogen, calculated, 82.7% carbon and 9.4% hydrogen. The infrared spectrum of the product was consistent with the structure of 4,4'-sec-butylidenebis(2-cyclohexylphenol).

EXAMPLE 2

A mixture of 2115 g. of o-cyclohexylphenol, 700 ml. of toluene, and 2 ml. of octyl mercaptan was heated to 40° C. and saturated with hydrogen chloride as in Example 1. To this solution there was added with stirring 228.3 g. of methyl amyl ketone at 39.42° C. in 7 minutes. Stirring and HCl addition was continued at 35–41° C. for 18.75 hours. The reaction mixture was worked up as in Example 1 to obtain 302 g. of crude 4,4'-(1-methylhexylidene)bis(2-cyclohexylphenol). This crude product was crystallized from ethylcyclohexane to yield a white, finely crystalline solid melting at 127–129.5° C. Elemental analysis showed 83.2% carbon and 9.4% hydrogen, the theoretical values being 83.1% carbon and 9.8% hydrogen. The infrared spectrum of the product was consistent with its structure as named.

EXAMPLE 3

A mixture of 264 g. of o-cyclohexylphenol, 50 ml. of toluene, 70.6 g. of 2-nonadecanone, and 1 ml. of octyl mercaptan was combined and reacted at 40–49° C. for 30 hours in the presence of HCl as shown above. From the reaction mixture there was obtained as before 143 g. of crude 4,4'-(1-methyloctadecylidene)bis(2-cyclohexylphenol), a viscous brown liquid which resisted crystallization. The structure of the product as named was verified by infrared examination. Elemental analysis showed 83.9% carbon and 10.3% hydrogen, the theoretical values being 83.9% carbon and 10.7% hydrogen.

EXAMPLE 4

4,4'-(1-methylbutylidene)bis(2-cyclopentylphenol) was prepared as in the above examples by reacting 81.0 g. of o-cyclopentylphenol with 21.5 g. of 2-pentanone in 100 ml. of ethylcyclohexane in the presence of HCl and octyl mercaptan. Reaction temperature was 39–43° C. and the reaction time was 29.5 hours. The crude bisphenol was a dark reddish solid which amounted to 66.8% g. It crystallized from ethylcyclohexane solvent to form fine white crystals, M.P. 123.5–125° C. The identity of the product was confirmed as before by infrared and elemental analyses.

EXAMPLE 5

In the manner described in the foregoing examples, 706 g. of o-cyclohexylphenol and 58 g. of propionaldehyde were reacted at 33–45° C. for 4.5 hrs. in the presence of HCl using 500 ml. toluene as solvent. The distillation residue obtained from the reaction mixture was an amber glasslike solid amounting to 307 g. which was recrystallized from ethylcyclohexane to give white crystals, M.P. 161–163° C. Its identity as 4,4'-propylidenebis(2-cyclohexylphenol) was verified by infrared examination.

EXAMPLE 6

As shown above 99 g. of 6-cyclohexyl-o-cresol and 30.5 g. of heptaldehyde were reacted by stirring together for 17 hrs. at 16–41° C. in 100 ml. of toluene with the reaction mixture and saturated with anhydrous hydrogen chloride. The crude 4,4'-heptylidenebis-(6-cyclohexyl-o-cresol) obtained was a gummy brown solid amount to 66.3 g. Crystallization from a petroleum hydrocarbon solvent (B.R. 86–100° C.) yielded an off-white crystalline solid of M.P. 138.5–140° C. Its structure as the product named was verified by infrared examination.

EXAMPLE 7

A mixture of 2115 g. of o-cyclohexylphenol and 700 ml. of toluene was heated in a reaction flask to 40° C., whereupon a clear solution was formed. The solution was saturated with hydrogen chloride by bubbling in the dry halide and 3.9 g. of methyl mercaptan was added. Addition of dry HCl was continued with stirring and 196 g. of cyclohexanone was added over a period of 30 minutes at 39–41° C. Stirring and HCl addition were continued for 4.5 hours at 38–40° C. The reaction mixture was then blown with nitrogen for 1 hr. at 38–40° C. to remove dissolved HCl. The solution was diluted with 900 ml. of toluene and then washed with five 500 ml. portions of water. The washed mixture was distilled under reduced pressure to obtain a fraction consisting of 1406 g. of recovered o-cyclohexylphenol and a distillation residue of 812 g. of crude 4,4'-cyclohexylidenebis(2-cyclohexylphenol), a light amber solid. White crystals of the pure compound melting at 165–166° C. were obtained by recrystallization of the crude product from hydrocarbon solvents. Elemental analysis of the purified compound showed: carbon, 83.5% and hydrogen 9.1%. Calculated for 4,4'-cyclohexylidenebis(2-cyclohexylphenol): carbon, 83.3% and hydrogen 9.3%. The structure of the product was confirmed by infrared examination as being that of the compound named.

EXAMPLE 8

A mixture of 528 g. of o-cyclohexylphenol, 77.1 g. of 4-tert-butylcyclohexanone, 100 ml. of toluene, and 1 ml. of octanethiol was saturated with dry hydrogen chloride and stirred for 21 hours at 38–45° C. Upon distillation as in Example 1, 214 g. of crude 4,4-(4-tert-butylcyclohexylidene)bis(2-cyclohexylphenol) was obtained as a light amber brittle solid. Recrystallization from ethylcyclohexane yielded while crystals of the pure compound melting at 193.5–195° C. Elemental analysis showed: carbon, 83.5% and hydrogen, 9.3%; calculated from the product as named, carbon, 83.6% and hydrogen, 9.8%. Infrared examination confirmed the structure of the product as consistent with that of 4,4'-(4-tert-butylcyclohexylidene)bis(2-cyclohexylphenol).

EXAMPLE 9

A mixture of 528 g. of o-cyclohexylphenol, 42 g. of cyclopentanone, 100 ml. of toluene, and 1 ml. of octanethiol was reacted at 39–41° C. for 15 hours in the presence of dissolved hydrogen chloride. The reaction mixture was worked up as above to obtain 108 g. of crude 4,4'-cyclopentylidenebis(2-cyclohexylphenol), and amber solid which resisted purification by crystallization. Elemental analysis showed 83.2% carbon and 9.1% hydrogen; calculated 83.2% carbon and 9.2% hydrogen. The structure of the product was verified by infrared examination.

EXAMPLE 10

A reaction mixture of 57.4 g. of 6-cyclohexyl-o-cresol, 14.7 g. of cyclohexanone, 200 ml. of toluene, and 2 g. of methyl mercaptan was saturated with hydrogen chloride and stirred for 18 hours at 38–42° C. From the mixture there was obtained as before 9 g. of a light brown resinous solid which was crystallized from ethylcyclohexane to yield fine white crystals, melting point 189–191.5° C. The identity of the product as 4,4'-cyclohexylidenebis(6-cyclohexyl-o-cresol) was confirmed by infrared examination and elemental analysis.

EXAMPLE 11

A reaction mixture of 48.6 g. of o-cyclopentylphenol, 14.7 g. of cyclohexanone, 100 ml. of a petroleum naphtha and 1 ml. of octanethiol was saturated with hydrogen chloride and stirred for 17.6 hours at 39–41° C. The reaction mixture was then cooled to 24° C. and filtered to recover the crystals which formed. After washing with solvent and drying 22 g. of light pink crystalline 4,4'-cyclohexylidenebis(2 - cyclopentylphenol) was obtained, melting point 141–143° C. Further purification by recrystallization yielded pure white crystals, M.P. 142–143.5° C. The identity of the product was confirmed by infrared and elemental analysis.

EXAMPLE 12

A mixture of 264.4 g. of o-cyclohexylphenol, 28 g. of cycloheptanone, 80 ml. of toluene, and 1 ml. of octanethiol was reacted in the presence of dissolved hydrogen chloride with stirring for 16.5 hours at 38–42° C. The distillation residue obtained from this mixture was a brown, resinous solid, weight 42 g. Crystallization from ethylcyclohexane yielded fine white crystals, melting point 150–152.5° C. Its structure was confirmed by infrared examination and elemental analysis as 4,4' - cycloheptylidenebis(2 - cyclohexylphenol).

EXAMPLE 13

A mixture of 264.4 g. of o-cyclohexylphenol, 31.6 g. of cyclooctanone, 80 ml. of toluene, and 1 ml. of octanethiol was reacted in the presence of dissolved hydrogen chloride with stirring for 19.6 hours at 38–40° C. The reaction mixture was worked up as before to obtain 8.8 g. of crude 4,4' - cyclooctylidenebis-(2 - cyclohexylphenol), a brown resinous solid. Crystallization from ethylcyclohexane gave a white crystalline solid, M.P. 150.5–152° C. Its structure was confirmed by infrared analysis as that of the compound named.

By the same general procedure used in the above examples, similar yields of the corresponding bisphenols are obtained by reacting other o-cycloalkylphenols with the aldehydes and ketones having the structures previously described. In general, the presence of long alkyl chains in either reactant and increased substitution of the phenols lengthens reaction times and makes the products more difficult to crystallize.

These new compounds have been found to possess unexpectedly high stabilizing efficacy when compounded with polyolefins. Normally solid polymers of this type, including polyethylene, polypropylene, polybutylene, polybutadiene, poly(4-methyl-1-pentene), polystyrene, and mixed polymers such as ethylene-propylene polymers and other such mixtures including physical mixtures of polyolefins as well as polymers obtained by the copolymerization of mixed monomers are thereby protected to a surprisingly high degree against the degradative effects of oxidation.

These new compounds are also effective stabilizers in hydrocarbons such as gasoline, lubricating oils, and similar products derived from petroleum to protect these materials against oxidative degradation.

As stabilizers in polyolefins, the compounds of this invention may be employed in proportions of about 0.001% to about 1.0% by weight of the composition, depending upon the particular polyolefin and the degree of stability required. In most cases, 0.01% to about 0.5% is preferable. They exhibit their stabilizing effect most strikingly and are therefore preferably used in combination with about 0.02% to about 1.0% by weight of an auxiliary antioxidant known to promote the stabilizing efficiency of phenolic compounds. Suitable auxiliary antioxidants include in particular higher alkyl esters of thiodialkanoic acids, such as the dilauryl and distearyl esters of 3,3'-thiodipropionic acid whose mixtures with phenolic antioxidants show synergistic stabilizing efficiencies.

In representative procedure, a bisphenol is compounded with a polyolefin and the composition is tested as shown below.

Essentially linearly polymerized crystalline polypropylene was employed for testing. A quantity of about 500 g. of granular polypropylene having a melt index of about 3 is stirred in an open container with about 200 ml. of a methylene chloride solution of the additive or additives to be tested. Stirring is continued until nearly all the methylene chloride has evaporated and the additive has been thoroughly dispersed. The treated polypropylene is dried at 60° C. under nitrogen in a vacuum oven for about 4 hours. The additive (or mixture of additives) is then further mixed with the polymer by extrusion at about 250° C. The extruded plastic, after being converted into pellet form for handling, is then compression-molded at about 230° C. into 100 mil thick samples. These test pieces are exposed in a circulating air oven at 150° C. and are examined periodically until the first signs of degradation are noted. This oxidative degradation shows up in the formation of spots of powdery disintegration of the solid structure and is usually associated with a slight darkening of the polymer. The time in hours to reach this point is referred to as the "oven-life" and where two figures are given in the following table for a particular composition, these are respectively the time of the last observation when the sample appeared unchanged and the time of the next observation when signs of degradation were first seen.

Some representative test results using these new compounds as stabilizers are shown in Tables I and II and results obtained with known bisphenol stabilizers are included for comparison. Percentages are by weight of the total composition.

TABLE I

| Additive: | Oven-life, hrs. |
|---|---|
| None | Less than four |
| 0.1% 4,4' - cyclohexylidenebis(2 - cyclohexylphenol) | 80 |
| 0.5% Dilauryl 3,3'-thiodipropionate (DLTDP) | 500 |
| 0.05% 4,4' - cyclohexylidenebis(2-cyclohexylphenol); 0.5% DLTDP | 2470–2530 |
| 0.05% polybutylated bisphenol A; 0.05% DLTDP | 1130–1210 |
| 0.05% 4,4' - butylidenebis(6 - tert-butyl-m-cresol); 0.5% DLTDP | 1230–1250 |

In Table II the stabilizing efficiencies of some representative bisphenols of this invention and those of some known bisphenols of related structure are compared. In each case, 0.05% by weight of bisphenol and 0.25% by weight of dilauryl thiodipropionate were added to the polypropylene.

TABLE II

| Bisphenol: | Oven-life, hrs. |
|---|---|
| 4,4' - cyclohexylidenebis(2 - cyclohexylphenol) | 2060–2120 |
| 4,4' - sec - butylidenebis(2 - cyclohexylphenol) | 1920–1980 |
| 4,4' - (1 - methylhexylidene)bis(2 - cyclohexylphenol) | 1920–1980 |
| 4,4' - cyclopentylidenebis(2 - cyclohexylphenol) | 2040–2060 |
| 4,4' - methylenebis(2 - cyclohexylphenol) | 880–900 |
| 4,4' - cyclohexylidenebis(2 - tert - butylphenol) | 1010–1040 |
| 4,4' - isopropylidenebis(2 - cyclohexylphenol) | 1400–1420 |
| Polybutylated bisphenol A | 650–710 |
| 4,4' - butylidenebis(6 - tert - butyl - m-cresol) | 650–710 |

Other alkylidenebis(2-cycloalkylphenols) of the structure defined have similar advantageous stabilizing characteristics when incorporated as shown in polypropylene or other polyolefins of the same general type.

We claim:

1. A composition of matter comprising a normally solid linear polyolefin having incorporated therein a small but stabilizing quantity of a bisphenol having the formula

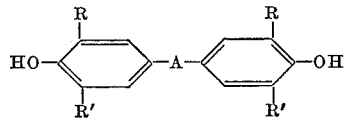

wherein R is hydrogen, lower alkyl, or cycloalkyl of 4–8 carbon atoms, R' is cycloalkyl of 4–8 carbon atoms or a lower alkyl substitution product thereof, and A is cycloalkylidene of 4–8 carbon atoms or a lower alkyl substitution product thereof, the term "lower alkyl" being defined herein as having from one to four carbon atoms.

2. A composition as described in claim 1 wherein the polyolefin is polypropylene.

3. A composition as described in claim 1 wherein there is additionally incorporated a stabilizing quantity of a higher alkyl diester of thiodipropionic acid.

4. The composition of claim 1 wherein R in the bisphenol formula is hydrogen.

5. A composition of matter comprising an essentially crystalline and linearly polymerized polypropylene having incorporated therein from about 0.001% to about 1.0% by weight of a bisphenol having the structure defined in claim 1 and from about 0.02% to about 1.0% by weight of a higher alkyl diester of thiodipropionic acid.

6. The composition of claim 5 wherein the bisphenol is 4,4'-cyclohexylidenebis(2-cyclohexylphenol).

7. The composition of claim 5 wherein the bisphenol is 4,4'-cyclopentylidenebis(2-cyclohexylphenol).

References Cited

UNITED STATES PATENTS

| | | | |
|---|---|---|---|
| 2,903,493 | 9/1959 | Lambert | 260—45.95 |
| 3,378,516 | 4/1968 | Tholstrup | 260—45.95 |

FOREIGN PATENTS

| | | |
|---|---|---|
| 851,670 | 10/1960 | Great Britain. |
| 1,147,527 | 11/1957 | France. |

DONALD E. CZAJA, Primary Examiner

V. P. HOKE, Assistant Examiner

U.S. Cl. X.R.

260—45.95, 75, 666.5